United States Patent [19]

Ueda et al.

[11] Patent Number: 4,525,469

[45] Date of Patent: Jun. 25, 1985

[54] CATALYST COMPOSITION FOR POLYMERIZING OLEFINS

[75] Inventors: Takashi Ueda, Ohtake; Norio Kashiwa, Iwakuni, both of Japan

[73] Assignee: Mitsui Petrochemical Industries Ltd., Tokyo, Japan

[21] Appl. No.: 545,178

[22] Filed: Oct. 25, 1983

[30] Foreign Application Priority Data

Oct. 25, 1982 [JP] Japan .................................. 57-186043

[51] Int. Cl.$^3$ ................................................ C08F 4/64
[52] U.S. Cl. ...................... 502/125; 502/111; 526/142; 526/138
[58] Field of Search ............... 502/125, 111

[56] References Cited

U.S. PATENT DOCUMENTS

| | | | |
|---|---|---|---|
| Re. 30,970 | 6/1982 | Hyde et al. ................ | 502/125 X |
| 4,279,776 | 7/1981 | Shiga et al. ................ | 502/125 X |
| 4,316,818 | 2/1982 | Welch et al. ................ | 502/125 X |
| 4,331,561 | 5/1982 | Luciani et al. .............. | 502/125 |
| 4,335,015 | 6/1982 | Imai et al. .................. | 502/125 X |
| 4,395,360 | 7/1983 | Aleizatti et al. ............ | 502/125 X |

*Primary Examiner*—Patrick P. Garvin
*Attorney, Agent, or Firm*—Sherman & Shalloway

[57] ABSTRACT

A catalyst composition for the polymerization or copolymerization of olefins composed of (A) a titanium component (a-1) or (a-2), (a-1) a highly active titanium component containing titanium, magnesium and halogen as essential ingredients, or (a-2) a highly active titanium catalyst component obtained by treating component (a-1) with an organic compound containing active hydrogen bonded to oxygen, and (B) an organoaluminum compound component, wherein (i) when component (A) is the component (a-1), component (b) is an organoaluminum compound component obtained by treating a halogen-containing organoaluminum compound having a halogen/Al atomic ratio of at least 1 but less than 2 with a compound selected from the group consisting of water and organic compounds having active hydrogen bonded to oxygen, and (ii) when component (A) is the component (a-2), the component (B) is a halogen-containing organoaluminum compound having a halogen/Al atomic ratio of at least 1 but less than 2, and the ratio of the amount (x) of the organic compound having active hydrogen atom bonded to oxygen and/or an oxygen-containing group derived from said organic compound to the amount (y) of titanium, x:y, is 4–100:1.

10 Claims, No Drawings

CATALYST COMPOSITION FOR POLYMERIZING OLEFINS

This invention relates to a catalyst composition for polymerizing or copolymerizing olefins, which is particularly suited for the production of olefin polymers or copolymers having a narrow composition distribution with a high catalytic efficiency.

More specifically, this invention relates to a catalyst composition for the polymerization or copolymerization of olefins composed of (A) a titanium component (a-1) or (a-2),
- (a-1) a highly active titanium component containing titanium, magnesium and halogen as essential ingredients, or
- (a-2) a highly active titanium catalyst component obtained by treating component (a-1) with an organic compound containing active hydrogen bonded to oxygen, and (B) an organoaluminum compound component, and wherein (i) when component (A) is the component (a-1), component (B) is an organoaluminum compound component obtained by treating a halogen-containing organoaluminum compound having a halogen/Al atomic ratio of at least 1 but less than 2 with a compound selected from the group consisting of water and organic compounds having active hydrogen bonded to oxygen, and (ii) when component (A) is the component (a-2), the catalyst component (B) is a halogen-containing organoaluminum compound having a halogen/Al atomic ratio of at least 1 but less than 2, and the ratio of the amount (x) of the organic compound having active hydrogen atom bonded to oxygen and/or an oxygen-containing group derived from said organic compound to the amount (y) of titanium, x:y, is 4-100:1.

In the present application, the term "polymerization" is used sometimes to mean not only homopolymerization but also copolymerization, and likewise, the term "polymer" is used sometimes to mean not only a homopolymer but also a copolymer.

Olefin polymers have been extensively used as films, tapes, sheets, fibers, hollow articles, injection molded articles, etc. To impart excellent transparency, impact strength, etc., it is preferable to use polymers having a narrow molecular weight distribution or a narrow composition distribution. Particularly, with copolymers, as the content of a minor proportion of an olefin monomer increases, the breadth of their composition distribution tends to affect the properties of the copolymers to a greater extent. To obtain olefin polymers having a narrow distribution of molecular weight or composition, it is effective to polymerize olefins using catalysts formed from a vanadium-type catalyst component and an organoaluminum compound component. In the copolymerization of olefins, however, this type of catalyst has the defect that the amount of polymer yielded per unit weight of the catalyst is small. If a highly active solid component (a-1) containing magnesium, titanium and halogen which has previously been proposed is used instead of the vanadium-type catalyst, the amount of polymer yielded per unit weight of the catalyst can be tremendously increased. But in the copolymerization of ethylene with an alpha-olefin having at least 3 carbon atoms in the presence of this catalyst, it is difficult to obtain copolymers having a fully narrow composition distribution, and the resulting copolymers generally have a high melting point.

The present inventors have made investigations in order to develop an improved catalyst composition capable of producing an olefin polymer having a fully narrow composition distribution with a high catalytic efficiency, by utilizing the conventional highly active titanium catalyst component (a-1).

These investigations have led to the discovery that a catalyst composition composed of the aforesaid components (A) and (B) and meeting the requirements (i) and (ii) is an excellent catalyst composition which can achieve the aforesaid purpose.

It is an object of this invention therefore to provide an improved catalyst composition for the polymerization or copolymerization of olefins.

The above and other objects and advantages of this invention will become apparent from the following description.

The titanium catalyst component (A) in the catalyst composition of this invention is either (a-1) a highly active titanium component containing titanium, magnesium and halogen as essential ingredients, or (a-2) a highly active titanium component obtained by treating component (a-1) with an organic compound containing active hydrogen bonded to oxygen.

The component (a-1) is used in combination with a compound, as the organoaluminum compound component (B), obtained by treating a halogen-containing organoaluminum compound having a halogen/Al atomic ratio of at least 1 but less than 2 with a compound selected from the group consisting of water and organic compounds containing active hydrogen bonded to oxygen [requirement (i)].

The component (a-1) to be used in combination with the component (B) set forth in the requirement (i) is a known highly active titanium catalyst component which has heretofore been used in combination with an organoaluminum compound which has not been subjected to such a treatment as set forth in the requirement (i).

The component (a-1) utilized in this invention has a magnesium/titanium atomic ratio of preferably from 2/1 to 100/1, more preferably from 4/1 to 70/1, and a halogen/titanium atomic ratio of preferably from 4/1 to 100/1, more preferably from 10/1 to 70/1. It has a specific surface area of, for example, at least 3 $m^2/g$, preferably at least 40, more preferably at least 50 and especially preferably at least 100 $m^2/g$. Its upper limit is, for example, 800 $m^2/g$. Usually, the titanium compound is not liberated from the component (a-1) by a simple means of washing it with hexane at room temperature. Desirably, the X-ray spectrum of the component (a-1) shows a lower crystallinity than the magnesium compound used in the preparation of the component (a-1) or a much lower crystallinity than ordinary commercial magnesium dihalides.

The component (a-1) may contain other elements, metals, functional groups and electron donors in addition to titanium, magnesium, and halogen as essential ingredients. For example, it may contain elements or metals such as silicon, aluminum, zirconium and hafnium, functional groups such as alkoxy groups and aryloxy groups, and electron donors such as esters, amines, ethers, ketones, acid anhydrides, acid amides and acid chlorides. Generally, it is preferable for the component (a-1) to contain not too much electron donors.

Thus, the component (a-1) may contain an organic compound containing active hydrogen bonded to oxygen and/or oxygen-containing groups derived from the organic compound in addition to the aforesaid essential ingredients.

The method of producing the component (a-1) is known. For example, it can be prepared by contacting or reacting a magnesium compound (or magnesium metal) and a titanium compound with each other either directly or in the presence of at least one of electron donors and compounds of the other elements or metals exemplified above; or by first preliminarily contacting one or both of the magnesium compound (or magnesium metal) and the titanium compound with an electron donor or a compound of the other element or metal, and then contacting or reacting the compounds with each other. Many methods have already been proposed in the art for the preparation of such a highly active solid component. Typical methods are disclosed, for example, in U.S. Pat. Nos. 3,642,746, 4,298,718, 4,071,674, 3,642,746, 4,071,672 and 4,330,649, British Pat. No. 1,485,520 and European Pat. No. 22675.

Examples of the magnesium compound which can be used in preparing the component (a-1) include magnesium oxide, magnesium hydroxide, hydrotalcite, carboxylic acid salts of magnesium, alkoxy magnesiums, aryloxy magnesiums, alkoxy magnesium halides, aryloxy magnesium halides, magnesium, magnesium dihalides, alkyl magnesium halides, aryl magnesium halides, dialkyl magnesiums, the reaction products of such organic magnesium compounds as alkyl magnesium halides with silanols or siloxanes, and alkoxy-aluminum magnesium compounds or halides thereof.

Examples of the titanium compound which can be used in preparing the component (a-1) include titanium tetrahalides, alkoxytitanium halides, aryloxytitanium halides, tetraalkoxy titaniums, and tetraaryloxy titaniums.

Examples of the electron donors which can be used in preparing the component (a-1) include oxygen-containing electron donors such as alcohols, phenols, ketones, aldehydes, carboxylic acids, esters, ethers, acid amides, acid anhydrides and alkoxysilane compounds, and nitrogen-containing electron donors such as ammonia, amines, nitriles and isocyanates. Specific examples include alcohols having 1 to 18 carbon atoms such as methanol, ethanol, propanol, pentanol, hexanol, octanol, 2-ethylhexanol, dodecanol, octadecyl alcohol, oleyl alcohol, benzyl alcohol, phenylethyl alcohol, cumyl alcohol and isopropylbenzyl alcohol; phenols having 6 to 15 carbon atoms such as phenol, cresol, xylenol, ethylphenol, propylphenol, cumylphenol and naphthol which may have lower alkyl groups; ketones having 3 to 15 carbon atoms such as acetone, methyl ethyl ketone, methyl isobutyl ketone, acetophenone and benzophenone; aldehydes having 2 to 15 carbon atoms such as acetaldehyde, propionaldehyde, octyraldehyde, benzaldehyde, tolualdehyde and naphthaldehyde; organic acid esters having 2 to 18 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, enzyl benzoate, methyl toluate, ethyl toluate, amyl toluate, ethyl ethylbenzoate, methyl anisate, ethyl anisate, ethyl ethoxybenzoate, diethyl phthalate, diisobutyl phthalate, diisobutyl malonate, gamma-butyrolactone, delta-valerolactone, coumarin, phthalide and ethylene carbonate; inorganic acid esters such as ethyl silicate; acid halides having 2 to 15 carbon atoms such as acetyl chloride, benzoyl chloride, tolyl chloride and anisoyl chloride; ethers having 2 to 20 carbon atoms such as dimethyl ethers, diethyl ether, diisopropyl ether, dibutyl ether, diamyl ether, tetrahydrofuran, anisole and diphenyl ether; acid amides such as acetamide, benzamide and toluamide; amines such as methylamine, ethylamine, diethylamine, tributylamine, piperidine, tribenzylamine, aniline, pyridine, picoline and tetramethylethylenediamine; and nitriles such as acetonitrile, benzonitrile and tolunitrile. These electron donors may be used in combination.

Aluminum compounds having organic groups or silicon compounds having organic groups or halogens may be cited as typical examples of the compounds of the other metals or elements which can be used in preparing the component (a-1). Such aluminum compounds may be selected, for example, from trialkyl aluminums, aluminum halides, alkylaluminum alkoxides, and aluminum alkoxides. The silicon compounds having organic groups or halogens may, for example, be silicon tetrachloride, silicon alkoxyhalides, silicon aryloxyhalides, halopolysiloxanes, and tetraalkoxysilanes.

The component (a-1) may be supported on an inert inorganic compound such as silica, alumina or silica-alumina, or an organic compound such as polyethylene or polypropylene.

The other component (a-2) of the titanium catalyst component (A) used in this invention is a highly active titanium catalyst component obtained by treating the component (a-1) with an organic compound having active hydrogen bonded to oxygen.

When the component (a-2) is used, the ratio of the amount (x) of the organic compound having active hydrogen bonded to oxygen which has been used to treat the component (a-1) and/or an oxygen-containing group derived from the organic compound to the amount (y) of titanium, x:y, is 4–100:1, preferably 6–50:1.

At this time, as stated hereinabove, the component (a-1) itself to be treated may contain an organic compound having active hydrogen bonded to oxygen and/or oxygen-containing groups derived from the organic compound in addition to titanium, magnesium and halogen as essential components. In this case, the amount (x) means the total of the amount ($x_1$) of the active hydrogen-containing organic compound and/or the oxygen-containing groups derived from the organic compound which the component (a-1) itself contains and the amount ($x_2$) of the active hydrogen-containing compound and/or the oxygen-containing groups derived from the organic compound which are included in component (a-2) as a result of treatment. In this embodiment, the mole ratio of $x_2/y$ is preferably 2 or more, more preferably 4 or more.

The organic compound having active hydrogen bonded to oxygen used in treating the component (a-1) to form the component (a-2) is an organic compound having active hydrogen-containing groups such as hydroxyl and carboxyl groups and can be selected, for example, from alcohols, phenols, carboxylic acids, and adducts and complexes containing at least one of these compounds in the molecules.

Similar compounds may be cited as examples of the organic compound containing active hydrogen bonded to oxygen set forth in requirement (ii).

Specific examples of the organic compound having active hydrogen bonded to oxygen include aliphatic alcohols having 1 to 18 carbon atoms such as methanol, ethanol, n-propanol, isopropanol, n-butanol, isobutanol, sec-butanol, tert-butanol, n-pentanol, n-hexanol, n-octanol, 2-ethylhexanol, n-decanol, n-decyl alcohol, oleyl alcohol, ethoxy-ethanol, n-butoxyethanol, 1-butoxy-2-propanol, 2-chloroethanol, ethylene glycol and propylene glycol; alicyclic alcohols having 5 to 12 carbon atoms such as cyclopentanol and cyclohexanol; aromatic alcohols having 7 to 15 carbon atoms such as benzyl alcohol, phenylethyl alcohol and alpha,alpha-dimethylbenzyl alcohol; phenols having 6 to 16 carbon atoms such as phenol, cresol, xylenol, ethylphenol, isopropylphenol, t-butylphenol, hydroquinone and bisphenol A; aliphatic carboxylic acids having 1 to 18 carbon atoms such as acetic acid, propionic acid, butyric acid, valeric acid, caprylic acid, caproic acid, stearic acid, oleic acid, succinic acid and adipic acid; alicyclic carboxylic acids having 6 to 12 carbon atoms such as cyclohexanecarboxylic acid; aromatic carboxylic acids having 7 to 15 carbon atoms such as benzoic acid, toluic acid, salicylic acid and phthalic acid; and adducts or complexes having alcohols, phenols, carboxylic acids, etc. in the molecules, such as magnesium chloride-ethanol complex, magnesium chloride-propionic acid complex and aluminum chloride-n-butanol complex.

Of these, the alcohols, particularly aliphatic alcohols having 1 to 12 carbon atoms, above all ethanol, are preferred.

The treatment of the component (a-1) with the organic compound having active hydrogen bonded to oxygen to form the component (a-2) is carried out so that as stated above, the ratio of the amount (x) of the active hydrogen-containing organic compound such as alcohols, phenols or carboxylic acids and/or oxygen-containing groups derived from the organic compound such as alkoxy, aryloxy or acyloxy groups to the amount (y) of titanium is 4–100:1, preferablty 6–50:1. When the component (a-1) itself to be treated contains the aforesaid active hydrogen-containing organic compound and/or the oxygen-containing group derived from the aforesaid organic compound, the amount (x) means the total of the amount ($x_1$) of the aforesaid organic compound and/or oxygen-containing groups which the component (a-1) itself contains and the amount ($x_2$) of the organic compound and/or the oxygen-containing groups derived therefrom which are included in component (a-2) as a result of treatment. The total of $x_1$ and $x_2$ can be, for example, by hydrolyzing the resulting component (a-2) with a mixture of water and acetone, and quantitatively determining the resulting supernatant by gas chromatography. If the x:y mole ratio is less than 4:1, the effect of treatment with the organic compound having active hydrogen bonded to oxygen is insufficient. If the x:y mole ratio exceeds 100:1, an increase in effect corresponding to an increase in amount cannot be expected, and it only disadvantageously increases the amount of the organoaluminum compound component (B) used. Accordingly, the above treatment is preferably carried out so that x:y is 4–100:1, preferably 6–50:1.

The amount of the active hydrogen-containing organic compound used to form the component (a-2) can be properly chosen, and is, for example, 1 to 50 moles, preferably 3 to 30 moles, per titanium atom in the component (a-1) to be treated. Preferably, the above treatment of the component (a-1) with the active hydrogen-containing organic compound is carried out while the component (a-1) is diluted with an inert medium, preferably an inert hydrocarbon medium. Examples of the inert hydrocarbon medium which can be used at this time are aliphatic hydrocarbons such as pentane, hexane, heptane, octane, decane and kerosene; alicyclic hydrocarbons such as cyclopentane, methylcyclopentane and cyclohexane; aromatic hydrocarbons such as benzene, toluene, xylene and ethylbenzene; halogenated hydrocarbons such as ethylene chloride, ethyl chloride and chlorobenzene; and mixtures of these.

In the above treatment, the concentration of the component (a-1) in the inert hydrocarbon medium may be chosen properly. For example, it is about 1 to 200 millimoles/liter calculated as the titanium atom of the component (a-1). The treating temperature is, for example, about $-20°$ to $+180°$ C., preferably 20° to 120° C. The treating time can be varied properly depending upon the treating temperature. For example, the treating time is 1 minute to several tens of hours.

The component (a-2) which can be obtained as above may be used in the form of the as-obtained suspension or after it has been washed fully with an inert solvent.

Before introduction into the polymerization system, the component (a-2) may be pre-treated with an organoaluminum compound. Preferably, this pretreatment is carried out under relatively mild conditions. Otherwise, the pre-treatment would sometimes reduce the performance of the catalyst. Preferably, the pre-treatment is carried out by suspending the component (a-2) in an inert hydrocarbon medium to a concentration of about 1 to 200 millimoles/liter as titanium atom, and treating it with not more than 20 moles, preferably about 1 to 10 moles, per titanium atom of the organoaluminum compound at a temperature of from $-20°$ to 120° C.

The organoaluminum compound used in the pretreatment may be properly selected from compounds exemplified hereinbelow for the organoaluminum compound component (B) of the catalyst composition. Of these, trialkyl aluminums such as triethyl aluminum and triisobutyl aluminum are preferred.

As a result of the pre-treatment with the organoaluminum compound, the x:y mole ratio will sometimes fall below 4:1. But the improving effect of this invention can be fully obtained in this case, too.

The component (a-2) pre-treated with the organoaluminum compound can be used in the polymerization after it is well washed with an inert hydrocarbon. It may be fed to the polymerization system in the form of a suspension as obtained by the pretreatment. In the latter case, the organoaluminum compound used in the pre-treatment is used as part of the catalyst component (B). Hence, the halogen/Al atomic ratio of the catalyst component (B) is calculated in consideration of the organoaluminum compound used in the pre-treatment.

It is important to use a halogen-containing organoaluminum compound having a halogen/Al atomic ratio of at least 1 but less than 2, preferably from 1.25 to 1.75, as an average composition as the catalyst component (B) to be combined with the component (a-2). If the halogen/Al atomic ratio of the halogen-containing organoaluminum compound is less than the specified limit, it is difficult to obtain a polymer having a narrow composition distribution, and the activity of the catalyst is poor at high temperatures. On the other hand, when the halogen/Al atomic ratio is higher than the specified limit, the polymerization activity of the catalyst is poor.

Typical preferred examples of the organoaluminum compound component (B) to be combined with the component (a-2) are halogenated organoalumuinum compounds represented by the following general formula $$R_nAlX_{3-n}$$

wherein R represents a hydrogen atom or a hydrocarbon group such as an alkyl group having 1 to 15 carbon atoms or an alkenyl group having 2 to 8 carbon atoms, X represents a halogen atom, and n is a number represented by $1.0 \leq n < 2.0$, preferably $1.25 \leq n \leq 1.75$, as an average composition.

Specific examples include alkyl aluminum monohalides such as diethyl aluminum chloride and diisobutyl aluminum chloride; alkyl aluminum sesquihalides such as isobutyl aluminum sesquichloride and ethyl aluminum sesquibromide; mixtures of the foregoing compounds; mixtures of halogen-free alkyl aluminum compounds such as triethyl aluminum, triisobutyl aluminum and diethyl aluminum hydride with halogenated organoaluminum compounds such as those exemplified hereinabove, alkyl aluminum dihalides such as ethyl aluminum dichloride and isobutyl aluminum dichloride, with halogenating agents, for example aluminum trihalides such as aluminum trichloride, halogenated hydrocarbons such as ethyl chloride and isopropyl chloride and silicon tetrahalides such as silicon tetrachloride; mixtures of alkyl aluminum dihalides with alkyl aluminum monohalides or alkyl aluminum sesquihalides; and mixtures of the aforesaid halogenating agents with alkyl aluminum monohalides and alkyl aluminum sesquihalides.

In the above-exemplified mixtures, the amounts of the individual components are determined so that the value of n as the average composition is within the above-specified range.

Another preferred example of the organoaluminum compound (B) to be combined with the component (a-2) includes organoaluminum compounds treated with water or an organic compound having active hydrogen bonded to oxygen which are exemplified hereinbelow as the catalyst component (B) to be combined with the component (a-1).

When in the catalyst composition of this invention, the titanium catalyst component (A) is the component (a-1), it is combined with an organoaluminum compound obtained by treating a halogen-containing organoaluminum compound having a halogen/Al atomic ratio of at least 1 but less than 2, preferably from 1.25 to 1.75 with a compound selected from the group consisting of water and organic compounds having active hydrogen bonded to oxygen as the catalyst component (B) [characteristic (i)]. The active hydrogen-containing organic compound may be the same as those which have already been exemplified above with regard to the formation of the component (a-2).

Typical preferred examples of the organoaluminum compound to be treated with water or the active hydrogen-containing organic compound are halogenated organoaluminum compounds represented by the following formula $$R_nAlX_{3-n}$$

wherein R represents a hydrogen atom or a hydrocarbon group such as an alkyl group having 1 to 15 carbon atoms or an alkenyl group having 2 to 8 carbon atoms, X represents a halogen atom, and n is a number represented by $1.0 \leq n < 2.0$, preferably $1.25 \leq n \leq 1.75$, as an average composition.

Specific examples include alkyl aluminum monohalides such as diethyl aluminum chloride and diisobutyl aluminum chloride; alkyl aluminum sesquihalides such as isobutyl aluminum sesquichloride and ethyl aluminum sesquibromide; mixtures of the foregoing compounds; mixtures of halogen-free alkyl aluminum compounds such as triethyl aluminum, triisobutyl aluminum and diethyl aluminum hydride with halogenated organoaluminum compounds such as those exemplified hereinabove, alkyl aluminum dihalides such as ethyl aluminum dichloride and isobutyl aluminum dichloride, with halogenating agents, for example aluminum trihalides such as aluminum trichloride, halogenated hydrocarbons such as ethyl chloride and isopropyl chloride and silicon tetrahalides such as silicon tetrachloride; mixtures of alkyl aluminum dihalides with alkyl aluminum monohalides or alkyl aluminum sesquihalides; and mixtures of the aforesaid halogenating agents with alkyl aluminum monohalides and alkyl aluminum sesquihalides.

In the above-exemplified mixtures, the amounts of the individual components are determined so that the value of n as the average composition is within the above-specified range.

The treatment of the halogen-containing organoaluminum compound with the compound selected from water and active hydrogen-containing organic compounds is carried out in the same way as described above with regard to the treatment of the component (a-1) with the active hydrogen-containing compound while halogen-containing organoaluminum compound is diluted in an inert medium of the type already exemplified.

The concentration of the halogen-containing organoaluminum compound in the inert medium during the above treatment may be selected properly. Preferably, it is 0.001 to 5 moles/liter, particularly 0.01 to 2 moles/liter.

A reaction product obtained by reacting the entire amount of the halogen-containing organoaluminum compound used with the above oxygen-containing compound selected from water and organic compounds having active hydrogen atom bonded to oxygen may be used. Alternatively, it is possible to react a part of the halogen-containing organoaluminum compound to be used with the aforesaid oxygen-containing compound, and mix the reaction product with the remainder of the organoaluminum compound. In any case, the amount of the oxygen-containing compound is, for example, 0.05 to 1.0 mole, preferably 0.1 to 0.8 mole, per mole of the halogen-containing organoaluminum compound. When a part of the halogen-containing organoaluminum compound is to be reacted with the oxygen-containing compound, the proportion of the organoaluminum compound is preferably at least 0.5 mole per mole of oxygen-containing compound.

When two or more organoaluminum compounds are used, the sequence of addition of these two or more organoaluminum compounds and the oxygen-containing compound may be optional. Preferably, however, the two or more organoaluminum compounds are first mixed, and a part or the whole of the resulting mixture is then mixed with the oxygen-containing organic compound.

The temperature at which to react the organoaluminum compound with the oxygen-containing compound selected from water and organic compounds having active hydrogen bonded to oxygen can be selected properly. For example, it is from $-20°$ to $+100°$ C., preferably from $-20°$ to $+70°$ C. The reaction time is not critical, and is, for example, 1 minute to several tens of hours, preferably from 2 minutes to 10 hours.

The structure of the compound obtained by the above reaction is not entirely clear. The present inventors, however, have noted the following facts when they analyzed the reaction product between an alkyl aluminum chloride such as diethyl aluminum chloride or ethyl aluminum sesquichloride and a compound having active hydrogen bonded to oxygen such as water, ethanol, n-butanol, butyl Cellosolve or propionic acid by IR spectroscopy. Specifically, when the proportion of the active hydrogen-containing compound is not more than 1 mole per mole of the alkyl aluminum chloride, the absorption peak based on the stretching vibration of —OH of the active hydrogen-containing compound completely disappeared in the reaction product. When the reaction temperature was varied, the absorption patterns of the IR spectrum changed accordingly. Thus, it is presumed that the structure of the product varies depending upon the reaction temperature. Furthermore, $^{13}$C-NMR analysis showed that when the proportion of the alkyl aluminum chloride is more than 1 mole, free alkyl aluminum was present in an amount corresponding to the excess amount of the alkyl aluminum chloride.

It is presumed that in either case, the compound having active hydrogen bonded to oxygen all reacts with the organoaluminum compound to form a bulky oligomer having a ring member structure, for example.

In a combination of the component (a-1) with the catalyst component, it is important that the halogen-containing organoaluminum compound (B) should be reacted in advance with the oxygen-containing compound. For example, even when the component (a-1), the organoaluminum compound not treated in advance with the oxygen-containing compound, and the oxygen-containing compound are directly fed into the polymerization zone, and olefin polymerization is carried out there, it is impossible to obtain an effect of producing a polymer having a narrower composition distribution attributable to the addition of the oxygen-containing compound.

The catalyst composition of this invention for the polymerization or copolymerization of olefins is particularly suitable for the production of olefin polymers or copolymers having a narrow composition distribution with a high catalytic efficiency.

Examples of the olefins used in the polymerization are $C_2$ to $C_{12}$ olefins such as ethylene, propylene, 1-butene, 4-methyl-1-pentene and 1-octene. They may be subjected not only to homopolymerization but also to random copolymerization and block copolymerization. In the copolymerization process, a polyunsaturated compound such as a conjugated diene or a non-conjugated diene may be selected as a comonomer.

The catalyst composition of this invention is most suitable for the production of resinous or waxy polymers by the homopolymerization of ethylene or the copolymerization of ethylene with a minor proportion of an alpha-olefin such as an alpha-olefin having 3 to 12 carbon atoms.

The polymerization can be carried out either in the liquid phase or in the vapor phase. In performing the polymerization in the liquid phase, an inert solvent such as hexane, heptane or kerosene may be used as a reaction medium, but the olefin itself may also serve as a reaction medium. Preferably, per liter of the volume of the reaction zone, the titanium catalyst component (A) is used in a proportion of about 0.0001 to about 1.0 millimole, and the organoaluminum compound (B) is used in such a proportion that the amount of the metal atoms in the component (B) is about 1 to about 2,000 moles, preferably from about 5 to about 500 moles, per mole of the titanium atom in component (A).

Hydrogen may be used in order to control the molecular weight of the polymer in the polymerization.

The polymerization temperature is preferably about 20° to about 300° C., more preferably about 50° to about 230° C. In particular, when ethylene is homopolymerized, or copolymerizeed with a minor amount (for example, up to about 15 mole%) of an alpha-olefin, it is preferred to perform solution polymerization in which the resulting polymer or copolymer dissolves in an inert hydrocarbon medium. In this case, the polymerization temperature is, for example, about 100° to about 230° C. The polymerization pressure is, for example, atmospheric pressure to about 200 kg/cm², preferably about 2 to about 50 kg/cm².

The polymerization can be carried out either batchwise, semicontinuously or continuously. In industrial practice, a continuous polymerization method is advantageous. The polymerization may be carried out in two or more polymerization zones having different polymerization conditions.

By using the catalyst of this invention, polymers having a narrow composition distribution can be produced with high polymerization activity. In particular, by copolymerizing ethylene with the catalyst of the invention, copolymers having a narrow distribution of composition can be advantageously produced.

The following examples specifically illustrate the catalyst composition of this invention and polymerization processes using the catalyst of this invention.

In the following examples, the composition distributions of the resulting copolymers are expressed by the following parameter U given by equation (1).

$$U = 100 \times (Cw/Cn - 1) \quad (1)$$

where Cw represents the weight average degree of branching and Cn represents the number average degree of branching.

Cw and Cn used in equation (1) for calculating U are determined by the following method.

The copolymer (10 g) is added to about 2 liters of a mixture of p-xylene and butyl Cellosolve (80:20 by volume) and the mixture is heated at about 130° C. in the presence of 2,5-di-tert.-butyl-4-methylphenol (0.1% by weiht based on copolymer) as a heat stabilizer. Then, about 1 kg of diatomaceous earth (tradename Celite #560, made by Johns-Manville Company, U.S.A.) was added to the resulting solution, and the mixture was cooled to room temperature with stirring. This operation results in coating the copolymer on diatomaceous earth. Then, the entire mixture is filled in a jacketed cylindrical column (diameter about 3 cm) which is set perpendicularly. While the column is maintained at a temperature of 30° C., a solvent having the same composition as the above mixed solvent in the same volume as a solution flowing from the bottom of the column is passed (about 1 liter/hr) through the column from its top. The solution flowing out from the bottom of the column is collected in a receiver. To the collected solution is addded methanol in an amount twice the volume of the collected solution to precipitate the eluted copolymer. After confirming that upon addition of methanol, the copolymer no longer precipitates, the flowing of the solution is stopped. The temperature of the column is then raised to 35° C., and the flowing of the solution and the passing of the mixed solvent are resumed and continued until the copolymer no longer flows out. The foregoing operation is carried out at intervals of 5° C. until the operation is finally carried out at 120° C. The copolymer fractions precipitated from methanol are separated by filtration and dried to obtain fractions.

The weight of each of the fractions is then measured, and the degree of branching per 1000 carbons [C] of each of the fractions is determined by the $^{13}$C-NMR method to be shown below.

Since the degree of branching per 1000 carbons [C] of the fraction decreases as the eluting temperature rises, the cumulative weight fractions [I(w)] are calculated in the decreasing order of eluting temperature. Under the assumption that the number of branches per 1000 carbons [C] and the cumulative weight fraction [I(w)] in each fractionated portion follow the logarithmic normal distribution of the following equation (2), parameters and $C_o$ in equation (2) are determined by using the method of least square.

$$I(w) = \frac{1}{\beta \sqrt{\pi}} \int_o^c \exp\left[ -\frac{1}{\beta^2} (\ln C/C_o)^2 \right] d(\ln C) \quad (2)$$

$\beta$ and $C_o$ are given by the following equations.

$$\beta^2 = 2\ln(Cw/Cn) \quad (3)$$

$$Co^2 = Cw \cdot Cn \quad (4)$$

Thus, Cn and Cw can be easily calculated.

The degree of branching, as used herein, denotes the number of branches per 1000 carbons in the copolymer chain, and is determined in accordance with the method disclosed in G. J. Ray, P. E. Johnson and J. R. Knox, Macromolecules, 10, 773 (1977) from the area intensity of a signal of methylenic carbon adjacent to a branch observed by the $^{13}$C-NMR spectrum. For example, when the comonomers are butene-1 and 4-metylpentene-1, the positions of the chemical shifts of the signals assigned to the above methylenic carbons are respectively 33.8 ppm and 34.5 ppm with TMS (tetramethylsilane) as a standard.

EXAMPLE 1

Preparation of catalyst

In a nitrogen atmosphere, 10 moles of commercial anhydrous magnesium chloride was suspended in 20 liters of hexane dehydrated and purified. With stirring, 60 moles of ethanol was added dropwise over the course of 1 hour, and the reaction was carried out for 1 hour at room temperature. To the reaction mixture was added dropwise at room temperature 26 moles of diethyl aluminum chloride, and the mixture was stirred for 2 hours. Then, 60 moles of titanium tetrachloride was added, and the mixture was heated to 80° C. At this temperature, the mixture was stirred for 3 hours to perform the reaction. After the reaction, the solid portion was separated and repeatedly washed with refined hexane. The resulting solid component (A-1) had the following composition.

| Ti  | Cl   | Mg (wt. %) | Al  | OEt* | OEt/Ti mole ratio |
|-----|------|------------|-----|------|-------------------|
| 3.7 | 67.0 | 20.0       | 0.4 | 4.8  | 1.4               |

Ethanol (5 moles) was added at room temperature to 500 millimoles, as Ti, of the component (A-1) suspended in refined hexane (Ti concentration 50 millimoles/liter). The temperature was raised to 50° C., and they were reacted at this temperature for 1.5 hours. After the reaction, the solid portion was repeatedly washed with refined hexane. The resulting catalyst (A-2) had the following composition.

| Ti  | Cl   | Mg (wt. %) | Al  | OEt* | OEt/Ti mole ratio |
|-----|------|------------|-----|------|-------------------|
| 1.2 | 53.0 | 16.0       | 0.1 | 22.6 | 20.0              |

*The resulting solid was decomposed and extracted with H$_2$O-acetone and quantitatively determined as ethanol by gas chromatography.

Polymerization

A 200-liter continuous polymerization reactor was continuously charged with 100 liters/hr of dehydrated and refined hexane, 7 millimoles/hr of diethyl aluminum chloride, 14 millimoles/hr of ethyl aluminum sesquichloride, and 0.6 millimole/hr, as Ti, of the catalyst component (A-2) prepared as above. Ethylene (13 kg/hr), 4-methtyl-1-pentene (19 kg/hr) and hydrogen (45 liters/hr) were simultaneously fed continuously into the polymerization vessel, and the monomers were copolymerized at a polymerization temperature of 165° C. and a total pressure of 30 kg/cm$^2$ for a residence time of 1 hour under such conditions that the concentration of the copolymer in the hexane solvent was maintained at 130 g/liter. The catalytic activity corresponded to 21,700 g of copolymer/mmole of Ti. The results are shown in Table 2. The copolymer had a narrow distribution of molecular weight and a narrow distribution of composition.

The resulting copolymer was formed into a film having a width of 350 mm and a thickness of 30μ by a commercial tubular film forming machine (made by Modern Machinery Company) for high-pressure polyethylene. The molding conditions were as follows:

Resin temperature: 180° C.
Rotating speed of the screw: 100 rpm
Diameter of the die: 100 mm
Die slit width: 0.7 mm The film was evaluated by the following methods.

Haze (%): measured in accordance with ASTM D1003.

Impact strength (Kg-cm/cm):

Measured by a film impact tester made by Toyo Seiki Co., Ltd. The spherical surface of the impact head had a diameter of 1".

Elmendorf tear strength (kg/cm): Measured in accordance with ASTM D1922.

Blocking value (g): Measured substantially in accordance with ASTM D1893. The peeling bar was made of glass, and the peeling speed was adjusted to 20 cm/min.

Heat seal starting temperature (°C.): Using a heat sealer made by Toyo Tester Co., Ltd., two films are heat-sealed over a 1 cm width at a given temperature (to be referred to as the heat seal temperature) under a pressure of 2 kg/cm$^2$ for a sealing time of 1 second. From the two films integrated by heat sealing, a rectangular test sample having a width of 15 mm and a length of 60 mm is cut out. One short side of the test sample is heat-sealed, and the other short side remains open. By using a tensile tester, the two open ends of the test sample are clamped by an air chuck and pulled at a pulling speed of 300 mm/min. at room temperature to perform a peeling test. At this time, the sample is observed to determine whether the breakage is due to peeling or occurs at parts other than the heat-sealed surface.

The above operation is repeated at varying heat sealing temperatures, and the heat seal temperature at which the breakage begins to occur at the parts other than the heat seal temperature is defined as the heat seal starting temperature.

The results are shown in Table 3.

COMPARATIVE EXAMPLE 1

The same continuous copolymerization as in Example 1 was carried out except that the catalyst (A-1) before reaction with ethanol was used instead of the Ti catalyst component (A-2). The catalyst activity corresponds to 19,100 g of copolymer/mmole of Ti. The properties of a film prepared from the resulting copolymer are shown in Table 3. Since the copolymer obtained in this example had a somewhat broad composition distribution, the resulting film had insufficient blocking resistance.

COMPARATIVE EXAMPLE 2

In the same polymerization as in Example 1, 20 mmoles/hr of triethyl aluminum as the organoaluminum compound component, 0.42 mmole/hr, as Ti atom, of (A-1) before reaction with ethanol used instead of the catalyst component (A-2), 13 kg/hr of ethylene, 40 liters/hr of hydrogen and 30 kg/hr of 4-methyl-1-pentene were continuously fed, and the monomers were polymerized. The catalyst activity corresponded to 31,000 g of copolymer/mmole of Ti. The results are shown in Tables 2 and 3.

The copolymer of obtained in this example had a considerably broad composition distribution, and the resulting film had poor transparency, blocking resistance and low-temperature heat sealability.

EXAMPLE 2

Preparation of catalyst

Ethanol (250 millimoles) was added to 50 millimoles, as Ti, of the component (A-1) obtained in Example 1. Subsequently, by performing quite the same operation as in Example 1, component (A-2) was prepared. It had the following composition.

| Ti | Cl | Mg (wt. %) | Al | OEt | OEt/Ti mole ratio |
|---|---|---|---|---|---|
| 1.7 | 51.5 | 19.0 | 0.2 | 20.9 | 13.0 |

Polymerization

Ethylene and 4-methyl-1-pentene were copolymerized continuously in the same way as in Example 1 except that the component (A-2) used in this example was used instead of the component (A-2) used in Example 1.

The results are shown in Tables 2 and 3.

As in Example 1, the resulting copolymer had a narrow distribution of composition and a narrow distribution of molecular weight.

Since the copolymer had a lowered density as compared with the copolymer of Example 1, the resulting film had improved transparency, impact strength and heat sealability. The heat seal starting temperature of this film is comparable to that of a commercial film of an ethylene/vinyl acetate copolymer having a vinyl acetate content of 5% by weight.

COMPARATIVE EXAMPLE 3

Preparation of catalyst

A suspension of the component (A-1) obtained in Example 1 in hexane was used, and 60 millimoles of ethanol was added to 0.30 millimoles, as Ti, of this hexane suspension. Subsequently, by performing the same operation as in Example 1, the component (A-2) was prepared. It had the following composition.

| Ti | Cl | Mg (wt. %) | Al | OEt | OEt/Ti mole ratio |
|---|---|---|---|---|---|
| 3.4 | 59.1 | 20.0 | 0.3 | 11.0 | 3.4 |

Polymerization

Ethylene and 4-methyl-1-pentene were continuously copolymerized under the conditions shown in Table 1 using the resulting component (A-2).

The results are shown in Tables 2 and 3.

The resulting copolymer had a narrow composition distribution, and in spite of its density being the same as the copolymer obtained in Example 2, the transparency, impact strength and heat-sealability of the film showed no characteristic attributed to the low density of the copolymer. On the other hand, the blocking resistance of the film was quite insufficient.

COMPARATIVE EXAMPLE 4

Preparation of catalyst

Ethanol (1 mole) was added to 50 millimoles, calculated as Ti atom, of a hexane suspension of the component (A-1) obtained in Example 1. Subsequently, by performing the same operation as in Example 1, the component (A-2) was prepared. It had the following composition.

| Ti | Cl | Mg (wt. %) | Al | OEt | OEt/Ti mole ratio |
|---|---|---|---|---|---|
| 0.3 | 36.6 | 12.5 | 0.1 | 43.5 | 140 |

Polymerization

When continuous polymerization was started under the same conditions as in Example 2 using the component (A-2) obtained as above, it did not at all proceed. Hence, the rate of feeding the organo-aluminum compound component (B) shown in Table 1 was gradually increased. When this rate reached 110 mmoles/hr, the polymerization process could be stably operated. The catalytic activity corresponded to 12,100 g of copolymer/mmole of Ti. The resulting copolymer had an MI of 1.78, and a density of 0.919 g/cm$^3$. The amount of the catalyst residue in the polymer was very large, and this caused foaming of the polymer. As a result, the polymer could not be formed into a film.

EXAMPLES 3 TO 8

Ethylene and an alpha-olefin were continuously copolymerized under the polymerization conditions shown in Table 1 using the component (A-2) obtained in Example 1. The results are shown in Tables 2 and 3.

EXAMPLE 9

Ethylene was homopolymerized under the polymerization conditions shown in Table 1 using the component (A-2) obtained in Example 1. The catalytic activity corresponded to 19,400 g of polyethylene/mmole of Ti. The resulting polyethylene had an MI of 9.70, and a density of 0.968 g/cm$^3$. The $\overline{M}w/\overline{M}n$ was 2.1, and its molecular weight distribution was very narrow.

EXAMPLE 10

Preparation of catalyst

Two liters of refined hexane was added to 4 liters (200 millimoles as Ti) of the hexane suspension of the component (A-1) obtained in Example 1 (at which time the concentration of Ti was 33 millimoles/liter). Then, 2 moles of ethanol was added at room temperature, and the mixture was heated to 80° C. and reacted at this temperature for 2 hours. After the reaction, the reaction mixture was allowed to cool to room temperature. Two liters (66 millimoles as Ti) of this suspension was transferred to another reactor, and the remainder was used in Examples and 11 and 12.

Then, 200 millimoles of triethyl aluminum was gradually added dropwise at room temperature, and reacted at room temperature for 1.5 hours. After the reaction, the solid portion was repeatedly washed with refined hexane, and obtained as a hexane suspension. The solid (A-2) had the following composition.

| Ti | Cl | Mg | Al | OEt | OEt/Ti |
|---|---|---|---|---|---|
| | | (wt. %) | | | mole ratio |
| 2.4 | 53.5 | 16.0 | 0.7 | 21.1 | 9.3 |

Polymerization

Ethylene and butene-1 were continuously copolymerized under the conditions shown in Table 1 using the component (A-2) obtained above. The results are shown in Tables 2 and 3.

In spite of their low density, pellets of the copolymer did not show blocking, and could be easily formed into a film. Furthermore, owing to its low density, the film was very transparent and had excellent heat sealability.

EXAMPLES 11 AND 12

Preparation of catalyst

Diethyl aluminum chloride (400 millimoles) was gradually added dropwise at room temperature to 4 liters (131 millimoles as Ti) of the hexane suspension obtained in Example 10 after reaction with ethanol. They were reacted at room temperature for 2 hours. After the reaction, 2 liters of the reaction product was withdrawn, and the solid portion was repeatedly washed with refined hexane and obtained as a hexane suspension. The hexane suspension was used in the polymerization of Example 11. The solid catalyst component formed had the following composition.

| Ti | Cl | Mg | Al | OEt | OEt/Ti |
|---|---|---|---|---|---|
| | | (wt. %) | | | mole ratio |
| 2.3 | 50.2 | 16.0 | 0.3 | 23.1 | 10.6 |

The remainder was used in the polymerization of Example 12.

Polymerization

Polymerization was carried out under the conditions shown in Table 1 using the titanium catalyst component obtained above. The results are shown in Tables 2 and 3.

EXAMPLES 13 TO 17

Preparation of catalyst

A hexane suspension of the component (A-1) obtained in Example 1 was treated with each of the organic compounds having active hydrogen bonded to oxygen shown in Table 4 under the conditions shown in Table 4.

The composition of the resulting titanium catalyst component (A-2) is also shown in Table 4.

Polymerization

Ethylene and 4-methyl-1-pentene were continuously copolymerized under the conditions shown in Table 1 using the titanium catalyst component obtained above. The results are shown in Table 2.

The resulting polymers had a very narrow distribution of molecular weight and a very narrow distribution of composition.

COMPARATIVE EXAMPLE 5

Polymerization

Continuous polymerization was started in the same way as in Example 1 except that the component (A-2) obtained in Example 1 was used, and ethyl aluminum dichloride was used as the organoaluminum catalyst component (B). The rate of polymerization, however, was very slow, and the pressure within the reactor began to rise. Hence, the rates of feeding the component (A-2) and the component (B) were gradually raised. When the rate of feeding was raised to 3.2 mmoles/hr for the component (A-2) and to 90 mmoles/hr for the component (B), steady operation became possible. The catalytic activity at this time was as low as 4,100 g of polymer/mmole of Ti, and the pellets showed coloration. Since the amount of the catalyst residue was large, the polymer was formed, and could not be molded into a film.

COMPARATIVE EXAMPLE 6

Polymerization

Ethylene and butene-1 were continuously copolymerized under the conditions shown in Table 1 using the component (A-2) obtained in Example 10. The resulting copolymer had the same density as the copolymer obtained in Example 12, but the pellets showed blocking and could not be formed into a film.

EXAMPLE 18

Preparation of catalyst

In a nitrogen atmosphere, 1 mole of commercial anhydrous magnesium chloride was suspended in 2 liters of n-decane dehydrated and refined. With stirring, 3 moles of 2-ethylhexanol was added, and the mixture was maintained at 120° C. for 3 hours. After the reaction, the solid disappeared, and a colorless clear solution was obtained. In this manner, an n-decane solution of magnesium chloride-2-ethylhexanol complex was obtained. This solution remained a colorless clear solution even at room temperature.

Into another reactor, 1.5 liters of n-decane and 2.4 moles of titanium tetrachloride were introduced in an atmosphere of nitrogen, and the mixture was cooled to 0° C. Then, 800 millimoles, as Mg, of the n-decane solution of magnesium chloride-2-ethylhexanol complex obtained above was added dropwise at 0° C. with stirring. After the addition, the temperature was raised to 80° C., and they were reacted at this temperature for 1 hour. After the reaction, the solid portion was repeatedly washed with n-decane and obtained as an n-decane suspension (Ti concentration 60 mmoles/liter). The composition of the solid portion (A-1) so obtained was as follows:

| Ti | Cl | Mg | OEH(*) | OEH/Ti |
|----|----|----|--------|--------|
|    | (wt. %) |  |  | mole ratio |
| 5.2 | 54.0 | 19.0 | 13.4 | 0.93 |

(*)2-Ethylhexoxy group, determined as 2-ethylhexanol by gas chromatography after hydrolysis with water-acetone and extracted with acetone.

One liter (60 millimoles as Ti) of the n-decane suspension of the component (A-1) obtained above was taken, and 600 millimoles of ethanol was added to it at room temperature. They were reacted at 50° C. for 1 hour. After the reaction, the solid portion was repeatedly washed with n-decane and obtained as an n-decane suspension.

The titanium catalyst component (A-2) so obtained had the following composition.

| Ti | Cl | Mg | OEH | OEt | (OEH + OEt)/Ti |
|----|----|----|-----|-----|----------------|
|    | (wt. %) |  |  |  | mole ratio |
| 2.0 | 47.2 | 15.0 | 4.1 | 16.0 | 9.4 |

Polymerization

Ethylene and 4-methyl-1-pentene were continuously copolymeized under the conditions shown in Table 1 using the component (A-2) obtained above. The results are shown in Table 2.

EXAMPLE 18'

Polymerization

The same continuous polymerization vessel as in Example 1 was used, and 60 liters/hr of hexane, 47 millimoles/hr of ethyl aluminum sesquichloride, and 2.8 millimoles/hr, as Ti, of the Ti catalyst component (A-2) obtained in Example 1 were continuously fed into the vessel. Ethylene (12 kg/hr), 4-methyl-1-pentene (8 kg/hr) and hydrogen (520 liters/hr) were simultaneously fed into the polymerization vessel continuously, and ethylene and 4-methyl-1-pentene were continuously polymerized at a polymerization temperature of 180° C. and a total pressure of 40 kg/cm$^2$ with a residence time of 2 hours while maintaining the concentration of the polymer at 200 g/liter. Thus, an ethylene/4-methyl-1-pentene copolymer wax was obtained. The catalytic activity corresponded to 7,100 g of the copolymer/mmole of Ti. The resulting copolymer wax had a viscosity average molecular weight of 3,700, and a density of 0.912.

The wax and a pigment (phthalocyanine blue) were blended at a ratio of 1:1, and the mixture was kneaded on a three-roll mill at 120° C. One gram of the kneaded mixture and 38 g of commercial high-pressure polyethylene were kneaded by Brabender plastography and then molded into a sheet having a thickness of 100 microns. The pigment was very uniformly dispersed with no coarse particles observed. At the time of kneading on the roll, the wax component did not at all adhere to the roll. It was found that this copolymer had very good properties as a pigment dispersing agent.

EXAMPLE 19

Preparation of catalyst 0.5 liter (30 millimoles as Ti) of the n-decane suspension of the component (A-1) obtained in Example 18, and 150 millimoles of 2-ethylhexanol was added to it at room temperature. The temperature was raised to 80° C., and they were reacted at this temperature for 1 hour. After the reaction, the reaction mixture was cooled to 0° C., and 35 millimoles of triethyl aluminum was added dropwise. After the addition, the reaction was carried out at 0° C. for 2 hours. After the reaction, the solid portion was repeatedly washed with n-decane to form an n-decane suspension. The titanium catalyst component (A-2) obtained had the following composition.

| Ti | Cl | Mg | Al | OEH | OEH/Ti |
|----|----|----|----|-----|--------|
|    |    | (wt. %) |  |  | mole ratio |
| 0.8 | 49.0 | 16.0 | 0.4 | 23.8 | 10.7 |

Polymerization

Ethylene and 4-methyl-1-pentene were continuously copolymerized under the conditions shown in Table 1 using the titanium catalyst component (A-2). The results are shown in Table 2.

COMPARATIVE EXAMPLE 7

Polymerization

Polymerization was carried out in the same way as in Example 18 except that the component (A-1) before reaction with ethanol was used instead of the titanium catalyst component (A-2). The results are shown in Table 2.

TABLE 1

| | Rate of feeding component (A) (mmol/hr) | Component (B) Type | Component (B) Feed rate (mmol/hr) | Comonomer Type | Comonomer Feed rate (kg/hr) | Rate of feeding H (Nl/hr) | Polymerizing temperature (°C.) |
|---|---|---|---|---|---|---|---|
| Example 1 | 0.60 | Et$_2$AlCl / Et$_{1.5}$AlCl$_{1.5}$ | 7 / 14 | 4-Methyl-1-pentene | 19 | 45 | 165 |
| Comparative Example 1 | 0.60 | Et$_2$AlCl / Et$_{1.5}$AlCl$_{1.5}$ | 7 / 14 | 4-Methyl-1-pentene | 19 | 45 | " |
| Comparative Example 2 | 0.42 | Et$_3$Al | 20 | 4-Methyl-1-pentene- | 30 | 40 | " |
| Example 2 | 0.72 | Et$_2$AlCl / Et$_{1.5}$AlCl$_{1.5}$ | 7 / 14 | 4-Methyl-1-pentene | 21 | 35 | " |
| Comparative Example 3 | 0.74 | Et$_2$AlCl / Et$_{1.5}$AlCl$_{1.5}$ | 12 / 12 | 4-Methyl-1-pentene | 22 | 35 | " |
| Comparative Example 4 | 0.72 | Et$_2$AlCl / Et$_{1.5}$AlCl$_{1.5}$ | 55 / 55 | 4-Methyl-1-pentene | 21 | 35 | " |
| Example 3 | 0.80 | Et$_{1.5}$AlCl$_{1.5}$ | 25 | 4-Methyl-1-pentene | 15 | 70 | " |
| Example 4 | 0.93 | Et$_{1.5}$AlCl$_{1.5}$ / EtAlCl$_2$ | 22 / 6 | 4-Methyl-1-pentene | 16 | 75 | " |
| Example 5 | 0.86 | Et$_3$Al / SiCl$_4$ | 25 / 7.5 | 4-Methyl-1-pentene | 14 | 20 | 180 |
| Example 6 | 0.90 | i-Bu$_3$Al / n-BuCl | 25 / 20 | 4-Methyl-1-pentene | 15 | 5 | 200 |
| Example 7 | 0.50 | Et$_2$AlCl / Et$_{1.5}$AlCl$_{1.5}$ | 12 / 12 | 1-Hexene | 15 | 45 | 165 |
| Example 8 | 0.45 | Et$_2$AlCl / Et$_{1.5}$AlCl$_{1.5}$ | 12 / 12 | 1-Octene | 8 | 45 | 165 |
| Example 9 | 0.67 | Et$_{1.5}$AlCl$_{1.5}$ | 25 | — | — | 250 | 165 |
| Example 10 | 0.94 | " | 15 | 1-Butene | 30 | 18 | 165 |
| Example 11 | 0.68 | Et$_{1.5}$AlCl$_{1.5}$ | 15 | 4-Methyl-1-pentene | 14 | 65 | 165 |
| Example 12 | 0.90 | Et$_2$AlCl / Et$_{1.5}$AlCl$_{1.5}$ | 10 / 10 | 1-Butene | 26 | 20 | 165 |
| Comparative Example 5 | 3.2 | EtAlCl$_2$ | 90 | 4-Methyl-1-pentene | 19 | 45 | 165 |
| Comparative Example 6 | 0.64 | Et$_3$Al / Et$_2$AlCl | 7 / 14 | 1-Butene | 30 | 15 | 165 |
| Example 13 | 0.86 | Et$_{1.5}$AlCl$_{1.5}$ | 25 | 4-Methyl-1-pentene | 14 | 45 | 165 |
| Example 14 | 0.81 | " | " | 4-Methyl-1-pentene | " | " | " |
| Example 15 | 0.92 | " | " | 4-Methyl-1-pentene | " | " | " |
| Example 16 | 0.97 | " | " | 4-Methyl-1-pentene | " | " | " |
| Example 17 | 0.94 | " | " | 4-Methyl-1-pentene | " | " | " |
| Example 18 | 1.00 | " | " | 4-Methyl-1-pentene | " | " | " |
| Example 19 | 0.97 | " | " | 4-Methyl-1-pentene | " | " | " |
| Comparative Example 7 | 1.51 | " | " | 4-Methyl-1-pentene | " | " | " |

Common conditions:
- Ethylene feed rate: 13 kg/hr
- Hexane feed rate: 100 l/hr
- Average residence time: 1 hour
- Polymer concentration: 130 g/l

TABLE 2

| | Catalytic activity (g-Polymer/mmol-Ti) | MFR (g/10 min) | Density (g/cm$^3$) | Mw/Mn | U |
|---|---|---|---|---|---|
| Example 1 | 21,700 | 1.95 | 0.923 | 2.5 | 10 |
| Comparative Example 1 | 19,100 | 1.94 | 0.922 | 3.1 | 55 |
| Comparative Example 1 | 31,000 | 2.10 | 0.920 | 3.4 | 108 |

TABLE 2-continued

| | Catalytic activity (g-Polymer/mmol-Ti) | MFR (g/10 min) | Density (g/cm³) | Mw/Mn | U |
|---|---|---|---|---|---|
| Example 2 | 18,100 | 1.87 | 0.916 | 2.7 | 15 |
| Comparative Example 2 | 17,600 | 2.11 | 0.916 | 3.2 | 77 |
| Comparative Example 3 | 12,100 | 1.51 | 0.919 | 3.1 | 39 |
| Example 3 | 16,300 | 2.21 | 0.920 | 2.3 | 6 |
| Example 4 | 14,000 | 2.03 | 0.921 | 2.3 | 10 |
| Example 5 | 15,100 | 2.19 | 0.921 | 2.7 | 31 |
| Example 6 | 14,400 | 1.90 | 0.916 | 2.8 | 26 |
| Example 7 | 26,000 | 2.45 | 0.913 | 2.9 | 18 |
| Example 8 | 28,900 | 2.12 | 0.931 | 2.3 | 17 |
| Example 9 | 19,400 | 9.70 | 0.368 | 2.1 | — |
| Example 10 | 13,800 | 1.85 | 0.896 | 2.6 | 24 |
| Example 11 | 19,100 | 2.05 | 0.918 | 2.3 | 5 |
| Example 12 | 14,400 | 1.79 | 0.905 | 2.4 | 19 |
| Comparative Example 5 | 4,100 | 0.68 | 0.928 | 3.3 | 47 |
| Comparative Example 6 | 20,300 | 2.01 | 0.905 | 3.5 | 113 |
| Example 13 | 15,100 | 2.23 | 0.921 | 2.6 | 12 |
| Example 14 | 16,000 | 1.65 | 0.921 | 2.4 | 15 |
| Example 15 | 14,100 | 2.01 | 0.922 | 2.9 | 29 |
| Example 16 | 13,400 | 2.00 | 0.918 | 2.7 | 21 |
| Example 17 | 13,800 | 1.88 | 0.920 | 2.7 | 17 |
| Example 18 | 13,000 | 2.39 | 0.918 | 2.8 | 33 |
| Example 19 | 13,400 | 1.92 | 0.923 | 2.7 | 26 |
| Comparative Example 7 | 8,600 | 1.93 | 0.921 | 3.3 | 69 |

TABLE 3

| | Haze (%) | Impact strength (Kg cm/cm) | Elmendorf tear strength MD (Kg/cm) | Elmendorf tear strength TD (Kg/cm) | Blocking resistance | Heat seal starting temperature (°C.) |
|---|---|---|---|---|---|---|
| Example 1 | 8.7 | 4,000 | 127 | 183 | 2.8 | 120 |
| Comparative Example 1 | 12.5 | 3,300 | 110 | 176 | 6.7 | 130 |
| Comparative Example 2 | 16.7 | 3,100 | 102 | 175 | 7.5 | 135 |
| Example 2 | 4.8 | 5,200 | 125 | 180 | 4.9 | 115 |
| Comparative Example 3 | 13.3 | 3,800 | 123 | 180 | 10.3 | 125 |
| Example 6 | 8.2 | 4,600 | 146 | 179 | 3.8 | 120 |
| Example 7 | 5.2 | 6,200 | 168 | 196 | 5.6 | 115 |
| Example 10 | 1.7 | 6,300 | — | — | — | 100 |
| Example 11 | 5.7 | 4,600 | 140 | 182 | 4.6 | 120 |
| Example 12 | 2.3 | 5,200 | — | — | — | 100 |
| Example 16 | 6.9 | 4,400 | 127 | 173 | 5.6 | 120 |

EXAMPLE 20

Preparation of a titanium catalyst component

In an atmosphere of nitrogen, 3 moles of commercial anhydrous magnesium chloride was suspended in 6 liters of dehydrated and refined hexane. With stirring, 18 moles of ethanol was added dropwise over the course of 1 hour, and the reaction was carried out at room temperature for 1 hour. Diethyl aluminum chloride (7.8 moles) was added dropwise at room temperature, and the mixture was stirred for 2 hours. Then, 18 moles of titanium tetrachloride was added, and the temperature was raised to 80° C. The reaction was carried out at this temperature for 3 hours with stirring. After the reaction, the solid portion was separated and repeatedly washed with refined hexane and obtained as a hexane suspension. Thus, the titanium catalyst component (A) was obtained.

Preparation of an organoaluminum compound catalyst component

Ethyl aluminum sesquichloride (500 millimoles) was added to 1 liter of dehydrated and purified hexane in an atmosphere of nitrogen, and the mixture was stirred. Then, 375 milliliters of ethanol diluted with hexane to 1 mole/liter was added dropwise at room temperature. The temperature was raised to 40° C., and the reaction was carried out at this temperature for 1 hour. After the reaction, the reaction mixture was allowed to cool to room temperature. In this way, an organoaluminum compound catalyst component (B) was obtained.

Polymerization

A 200 ml continuous polymerization vessel was used, and 100 liters/hr of dehydrated and purified hexane, 18 millimoles/hr, as Al, of the organoaluminum compound (B) obtained above, and 0.66 mmoles/hr, as Ti, of the titanium catalyst component (A) obtained above were continuously fed into the polymerization vessel. Ethylene (13 kg/hr), 4-methyl 1-pentene (13 kg/hr) and hydrogen (70 liters/hr) were continuously fed simultaneously into the polymerization vessel, and the monomers were copolymerized continuously at a polymerization temperature of 165° C. and a total pressure of 30 kg/cm² with an average residence time of 1 hour while the concentration of the copolymer in hexane was maintained at 130 liters/liter. The results are shown in Table 5. The copolymer obtained had a very narrow molecular weight distribution and a very narrow composition distribution.

A film was produced from the copolymer in the same way as described in Example 1. The results are shown in Table 5.

TABLE 4

| | Organic compound containing active hydrogen bonded to oxygen (H) | (H)/Ti (mole ratio) | Organoaluminum compound contacted after reaction of the active hydrogen-containing compound (L) | (L)/Ti (mole ratio) | Composition of the catalyst | | | | | | |
|---|---|---|---|---|---|---|---|---|---|---|---|
| | | | | | Ti | Cl | Mg (wt. %) | Al | OEt | (H')* | OEt + (H')/Ti (mole ratio) |
| Example 13 | n-Butanol | 5 | — | — | 1.0 | 41.4 | 16.0 | 0.2 | 3.8 | 23.1 | 18.9 |
| Example 14 | 2-Ethylhexanol | 5 | Et₃Al | 3.0 | 1.4 | 53.2 | 16.0 | 0.4 | 4.1 | 16.2 | 7.4 |
| Example 15 | Propionic acid | 5 | — | — | 1.2 | 56.1 | 17.0 | — | 4.5 | 14.1 | 11.6 |
| Example 16 | Butyl Cellosolve | 5 | — | — | 0.9 | 48.7 | 16.0 | — | 3.1 | 21.3 | 13.3 |
| Example 17 | Phenol | 5 | Et₃Al | 3.0 | 1.2 | 44.4 | 15.0 | 0.7 | 3.7 | 17.4 | 10.1 |

*Quantitatively determined as (H) by gas chromatography after hydrolysis with water-acetone and extraction with acetone.

EXAMPLE 21

Preparation of an organoaluminum compound catalyst component

A component (B) was prepared in the same way as in Example 20 except that the mole ratio of ethyl aluminum sesquichloride to ethanol was changed to 1:1.

Polymerization

Using the same continuous polymerization vessel as in Example 20, 10 mmoles/hr of ethyl aluminum sesquichloride, 10 mmoles/hr, calculated as Al, of the component (B) obtained above, and 0.62 mmole/hr, as Ti, of the titanium catalyst component (A) obtained in Example 20 were continuously fed into the vessel, and ethylene and 4-methyl-1-pentene were copolymerized under the conditions shown in Table 6. The results are shown in Tables 7 and 8.

The copolymer obtained had a very narrow distribution of molecular weight and a very narrow distribution of composition as in Example 20.

Since the copolymer had a lowered density as compared with Example 20, the transparency, impact strength and heat sealability of the resulting film were improved. The heat seal starting temperature of the film was comparable to that of a commercial film of an ethylene-vinyl acetate copolymer having a vinyl acetate content of 5% by weight.

COMPARATIVE EXAMPLE 8

Continuous copolymerization was carried out in the same way as in Example 20 except that 15 mmoles/hr of ethyl aluminum sesquichloride was fed instead of the component (B) obtained in Example 20, and the rates of feeding 4-methyl-1-pentene and hydrogen were changed as shown in Table 2. The results are shown in Tables 7 and 8. The resulting copolymer had a somewhat broad distribution of composition, and therefore, a film prepared therefrom had insufficient blocking resistance.

EXAMPLES 22 AND 23

Preparation of an organoaluminum compound catalyst component

The type of the organoaluminum compound and the mole ratio of it to ethanol was changed as in Table 5. Otherwise, in the same way as in Example 20, the component (B) was prepared. In all runs, the organoaluminum compound diluted with hexane to 1 mole/liter was mixed at room temperature beforehand, and ethanol diluted with hexane to 1 mole/liter was added dropwise to it.

Polymerization

Ethylene and an alpha-olefin were continuously copolymerized under the conditions shown in Table 6 using the component (A) obtained in Example 20 and the component (B) obtained above. The results are shown in Table 7. In Example 23, a film prepared from the copolymer was tested and the results are shown in Table 8. Even when the copolymer had such a low density, the pellets could be easily molded without blocking. Correspondingly to the low density of the copolymer, the resulting film was very transparent, and had excellent heat sealability.

COMPARATIVE EXAMPLES 9 AND 10

Preparation of an organoaluminum compound component

Components (B) were prepared under the conditions shown in Table 5 while the type of the organoaluminum compound and the mole ratio of it to ethanol was changed as in Table 5.

Polymerization

Copolymerization was carried out under the conditions shown in Table 6 using the components (B) obtained above and the component (A) obtained in Example 20. The results are shown in Tables 7 and 8.

In Comparative Example 9, the resulting copolymer had a broad composition distribution, and had insufficient blocking resistance and heat sealability.

In Comparative Example 10, the polymerization activity was extremely low, and a large amount of the catalyst residue was contained in the resulting polymer. Hence, the polymer was foamed, and could not be molded.

EXAMPLES 24 TO 29

Preparation of an organoaluminum compound component

In each run, the component (B) was prepared under the conditions shown in Table 5 by varying the types and mole ratios of the organoaluminum compound, the halogen compound other than the organoaluminum compound and the compound having active hydrogen bonded to oxygen as shown in Table 5.

Polymerization

Ethylene and an alpha-olefin were continuously copolymerized under the conditions shown in Table 6 using the component (B) as the organoaluminum compound component and the component (A) obtained in Example 20 as the titanium catalyst component. The results are shown in Table 7. In all runs, the copolymers obtained had a very narrow distribution of molecular weight and a very narrow distribution of composition.

EXAMPLE 30

Preparation of a Ti catalyst component

In an atmosphere of nitrogen, 1 mole of commercial anhydrous magnesium chloride was suspended in 2 liters of dehydrated purified n-decane. With stirring, 3 moles of 2-ethylhexanol was added, and the mixture was maintained at 120° C. for 3 hours. After the reaction, the solid disappeared, and a colorless clear solution resulted. In this manner, an n-decane solution of magnesium chloride/2-ethylhexanol was obtained. This solution remained a colorless clear solution even at room temperature.

Then, in another reactor, 1.5 liters of n-decane and 2.4 moles of titanium tetrachloride were introduced in an atmosphere of nitrogen. The mixture was cooled to 0° C. Then, 400 millimoles, as Mg, of an n-decane solution of magnesium/2-ethylhexanol complex obtained above was added dropwise at 0° C. with stirring. After the addition, the temperature was raised to 80° C., and the reaction was carried out at this temperature for 1 hour. After the reaction, the solid portion was repeatedly washed with n-decane and obtained as an n-decane suspension. In this manner, the titanium catalyst component (A) was obtained.

Polymerization

Ethylene and 4-methyl-1-pentene were copolymerized under the conditions shown in Table 6 using ethyl aluminum sesquichloride and the component (B) obtained in Example 21 as the organoaluminum compound component, and the component (A) obtained above as the titanium catalyst component. The results are shown in Table 6.

EXAMPLE 31

Preparation of a titanium catalyst component 400 millimoles, as Mg, of the n-decane solution of magnesium/2-ethylhexanol complex obtained in Example 30 was taken, and 80 millimoles of ethyl benzoate was added at room temperature. The mixture was stirred. It still remained a uniform solution. The uniform solution was added dropwise to 3.6 moles of titanium tetrachloride cooled to −20° C. over the course of 1 hour with stirring.

The temperature was then raised to 90° C., and the reaction was carried out at this temperature for 2 hours. After the reaction, the liquid portion was removed, and 2 moles of titanium tetrachloride was again added and reacted with the residue for 2 hours. After the reaction, the solid portion was repeatedly washed with n-decane and obtained as an n-decane suspension. In this manner, the titanium catalyst component (A) was obtained.

Polymerization

Ethylene and 4-methyl-pentene-1 were copolymerized under the conditions shown in Table 6 using ethyl aluminum sesquichloride and the component (B) obtained in Example 21 as the organoaluminum compound component and the component (A) as the titanium catalyst component. The results are shown in Table 7.

EXAMPLE 32

Preparation of a titanium catalyst component

Ethanol (400 millimoles) was added to 40 millimoles, as Ti, of the component (A) obtained in Example 20 with stirring at room temperature in an atmosphere of nitrogen. The temperature was then raised to 80° C., and they were reacted at this temperature for 1 hour. After the reaction, the reaction mixture was allowed to cool to room temperature. Triethyl aluminum (125 millimoles) was gradually added dropwise, and reacted at room temperature for 1.5 hours. After the reaction, the solid portion was repeatedly washed with purified hexane and obtained as a hexane suspension. In this manner, a titanium catalyst component (A) was obtained.

Polymerization

Ethylene and 4-methyl-1-pentene were copolymerized under the conditions shown in Table 6 using ethyl aluminum sesquichloride and the component (B) obtained in Example 21 as the organoaluminum compound component and the component (A) obtained above as the titanium catalyst component. The results are shown in Tables 7 and 8.

COMPARATIVE EXAMPLE 11

Polymerization

Continuous polymerization was carried out in the same way as in Example 20 except that instead of using the reaction product obtained by reacting ethyl aluminum sesquichloride and ethanol outside the polymerization system as the organoaluminum compound component, ethyl aluminum sesquichloride and ethanol in the same molar proportions as in Example 20 were separately fed into the polymerization system. The results are shown in Tables 7 and 8. The resulting copolymer had a broader distribution of molecular weight and a broader distribution of composition than the copolymer obtained in Example 1, and a film prepared therefrom had poor properties.

TABLE 5

| | Organoaluminum compound component (B) | | | (B-1)/(B-2)/(B-3) (mole ratio) | Mixing proportion | Reaction concentration (mol-Al/l) | Reaction temperature (°C.) | Reaction time (hr) |
| --- | --- | --- | --- | --- | --- | --- | --- | --- |
| | (B-1) | (B-2) | (B-3) | | | | | |
| Example 20 | Et$_{1.5}$AlCl$_{1.5}$ | — | Ethanol | 4/—/3 | (B-3) was added dropwise to (B-1) and reacted | 0.36 | 40 | 1 |
| Example 21 | Et$_{1.5}$AlCl$_{1.5}$ | — | Ethanol | 1/—/1 | (B-3) was added dropwise to (B-1) and reacted | 0.33 | 40 | 1 |
| Example 22 | Et$_2$AlCl | Et$_{1.5}$AlCl$_{1.5}$ | Ethanol | 2/1/2 | (B-1) and (B-2) were mixed and (B-3) was added dropwise to the mixture and reacted | 0.60 | 40 | 1 |
| Example 23 | Et$_{1.5}$AlCl$_{1.5}$ | EtAlCl$_2$ | Ethanol | 3/1/3 | (B-1) and (B-2) were mixed and (B-3) was added dropwise to the mixture and reacted | 0.57 | 40 | 1 |
| Comparative Example 9 | Et$_3$Al | Et$_2$AlCl | Ethanol | 2/2/3 | (B-1) and (B-2) were mixed and (B-3) was added dropwise to the mixture and reacted | 0.57 | 40 | 1 |
| Comparative Example 10 | EtAlCl$_2$ | — | Ethanol | 4/—/3 | (B-3) was added dropwise to (B-1) and reacted | 0.57 | 40 | 1 |
| Example 24 | i-Bu$_3$Al | AlCl$_3$ | n-Butanol | 1/1/1 | (B-1) and (B-2) were mixed and (B-3) was added dropwise | 0.67 | 25 | 0.75 |

TABLE 5-continued

| | Organoaluminum compound component (B) | | | (B-1)/(B-2)/(B-3) (mole ratio) | Mixing proportion | Reaction concentration (mol-Al/l) | Reaction temperature (°C.) | Reaction time (hr) |
|---|---|---|---|---|---|---|---|---|
| | (B-1) | (B-2) | (B-3) | | | | | |
| Example 25 | Et$_3$Al | n-Hexylchloride | 2-Ethyl-hexanol | 2/3/1 | (B-1) and (B-2) were mixed and (B-3) was added dropwise to the mixture and reacted | 0.33 | 25 | 1 |
| Example 26 | Et$_2$AlCl | SiCl$_4$ | Propionic acid | 30/3/1 | (B-1) and (B-2) were mixed and (B-3) was added dropwise to the mixture and reacted | 0.89 | 70 | 0.5 |
| Example 27 | Et$_{1.5}$AlCl$_{1.5}$ | — | Phenol | 4/—/3 | (B-1) was added dropwise to (B-3) and reacted | 0.75 | 40 | 2 |
| Example 28 | Et$_{1.5}$AlCl$_{1.5}$ | — | Butyl Cellosolve | 4/—/3 | (B-3) was added dropwise to (B-1) and reacted | 0.75 | 40 | 1 |
| Example 29 | Et$_{1.5}$AlCl$_{1.5}$ | — | Water | 8/—/1 | (B-3) was added dropwise to (B-1) and reacted | 0.33 | 0 | 0.5 |
| Example 30 | Et$_{1.5}$AlCl$_{1.5}$ | — | Ethanol | 1/—/1 | (B-3) was added dropwise to (B-1) and reacted | 0.33 | 40 | 1 |
| Example 31 | " | — | " | " | (B-3) was added dropwise to (B-1) and reacted | 0.33 | 40 | 1 |
| Example 32 | " | — | " | " | (B-3) was added dropwise to (B-1) and reacted | 0.33 | 40 | 1 |

TABLE 6

| | Rate of feeding component (A) (mmol-Ti/hr) | Rate of feeding component (B)* (mmol-Al/hr) | Component (B) additionally fed during the polymerization | | | Feed rate (kg/hr) | Rate of feeding hydrogen (nl/hr) | Polymerization temperature (°C.) |
|---|---|---|---|---|---|---|---|---|
| | | | Type | Feed rate (mmol-Al/hr) | Type | | | |
| Example 20 | 0.66 | 18 | — | 10 | 4-Methyl-1-pentene | 13 | 70 | 165 |
| Example 21 | 0.62 | 10 | Et$_{1.5}$AlCl$_{1.5}$ | 10 | 4-Methyl-1-pentene | 16 | 70 | 165 |
| Comparative Example 8 | 1.62 | — | Et$_{1.5}$AlCl$_{1.5}$ | 15 | 4-Methyl-1-pentene | 17 | 80 | 165 |
| Example 22 | 0.50 | 18 | — | — | 1-Hexene | 12 | 70 | 165 |
| Example 23 | 0.92 | 20 | — | — | 1-Butene | 27 | 25 | 165 |
| Comparative Example 9 | 0.48 | 15 | — | — | 4-Methyl-1-pentene | 17 | 15 | 180 |
| Comparative Example 10 | 4.8 | 60 | — | — | 1-Butene | 26 | 40 | 165 |
| Example 24 | 0.82 | 18 | — | — | 4-Methyl-1-pentene | 15 | 70 | 165 |
| Example 25 | 0.51 | 18 | — | — | 4-Methyl-1-pentene | 13 | 60 | 165 |
| Example 26 | 0.49 | 18 | — | — | 4-Methyl-1-pentene | 13 | 70 | 165 |
| Example 27 | 0.92 | 18 | — | — | 4-Methyl-1-pentene | 16 | 15 | 180 |
| Example 28 | 0.72 | 18 | — | — | 4-Methyl-1-pentene | 15 | 70 | 165 |
| Example 29 | 0.52 | 18 | — | — | 1-Hexene | 14 | 65 | 165 |
| Example 30 | 1.26 | 10 | Et$_{1.5}$AlCl$_{1.5}$ | 10 | 4-Methyl-1-pentene | 15 | 20 | 180 |
| Example 31 | 0.75 | 10 | Et$_{1.5}$AlCl$_{1.5}$ | 10 | 4-Methyl-1-pentene | 15 | 22 | 180 |
| Example 32 | 0.52 | 10 | Et$_{1.5}$AlCl$_{1.5}$ | 10 | 4-Methyl-1-pentene | 15 | 55 | 165 |

*See Table 1.

TABLE 7

|  | Catalytic activity (g-polymer/ mmol-Ti) | MFR (g/10 min) | Density (g/cm$^3$) | Mw/Mn | U |
|---|---|---|---|---|---|
| Example 20 | 19,700 | 1.89 | 0.921 | 2.4 | 11 |
| Example 21 | 21,000 | 2.05 | 0.915 | 2.5 | 21 |
| Comparative Example 8 | 8,000 | 2.11 | 0.923 | 2.9 | 51 |
| Example 22 | 26,000 | 2.11 | 0.922 | 2.5 | 13 |
| Example 23 | 14,100 | 1.90 | 0.898 | 2.7 | 27 |
| Comparative Example 9 | 27,200 | 2.23 | 0.922 | 3.3 | 93 |
| Comparative Example 10 | 2,700 | 1.97 | 0.899 | 3.0 | 42 |
| Example 24 | 15,900 | 2.10 | 0.918 | 2.4 | 19 |
| Example 25 | 25,500 | 2.02 | 0.923 | 2.6 | 26 |
| Example 26 | 26,600 | 1.95 | 0.921 | 2.8 | 30 |
| Example 27 | 14,100 | 1.95 | 0.916 | 2.8 | 33 |
| Example 28 | 18,100 | 2.24 | 0.920 | 2.5 | 23 |
| Example 29 | 25,000 | 2.09 | 0.917 | 2.5 | 19 |
| Example 30 | 10,300 | 2.02 | 0.922 | 2.8 | 36 |
| Example 31 | 17,300 | 2.31 | 0.919 | 2.7 | 31 |
| Example 32 | 25,000 | 1.98 | 0.917 | 2.2 | 4 |
| Comparative Example 11 | 23,100 | 2.21 | 0.922 | 3.2 | 58 |

TABLE 8

|  | Haze (%) | Impact strength (Kg cm/cm) | Elmendorf tear strength MD (Kg/cm) | Elmendorf tear strength TD (Kg/cm) | Blocking resistance (g) | Heat seal starting temperature (°C.) |
|---|---|---|---|---|---|---|
| Example 20 | 8.9 | 4,100 | 129 | 182 | 3.0 | 120 |
| Example 21 | 5.1 | 5,000 | 129 | 179 | 5.4 | 115 |
| Comparative Example 8 | 12.1 | 3,400 | 112 | 176 | 6.6 | 130 |
| Example 23 | 2.2 | 6,100 | — | — | — | 100 |
| Comparative Example 9 | 17.3 | 3,100 | 105 | 173 | 8.2 | 135 |
| Example 32 | 4.8 | 5,200 | 151 | 192 | 4.7 | 115 |
| Comparative Example 11 | 13.2 | 3,300 | 115 | 178 | 6.9 | 130 |

What is claimed is:

1. A catalyst composition for the polymerization or copolymerization of olefins composed of
(A) a titanium component (a-1) or (a-2),
   (a-1) a highly active titanium component containing titanium, magnesium and halogen as essential ingredients, or
   (a-2) a highly active titanium catalyst component obtained by treating component (a-1) with an organic compound containing active hydrogen bonded to oxygen, and
(B) an organoaluminum compound component, wherein
(i) when component (A) is the component (a-1), component (B) is an organoaluminum compound component obtained by treating a halogen-containing organoaluminum compound having a halogen/Al atomic ratio of at least 1 but less than 2 with a compound selected from the group consisting of water and organic compounds having active hydrogen bonded to oxygen, and
(ii) when component (A) is the component (a-2), the component (B) is a halogen-containing organoaluminum compound having a halogen/Al atomic ratio of at least 1 but less than 2, and the ratio of the amount (x) of the organic compound having active hydrogen atom bonded to oxygen and/or an oxygen-containing group derived from said organic compound to the amount (y) of titanium, x:y, is 4–100:1.

2. The catalyst composition of claim 1 wherein the organic compound having active hydrogen bonded to oxygen is a compound selected from the group consisting of alcohols, phenols, carboxylic acids and adducts and complexes of said alcohols, phenols or carboxylic acids with magnesium chloride or aluminum chloride.

3. The catalyst composition of claim 2 wherein the active hydrogen-containing organic compound is a compound selected from the group consisting of aliphatic alchols having 1 to 18 carbon atoms, alicyclic alcohols having 5 to 12 carbon atoms, aromatic alcohols having 7 to 15 carbon atoms, phenols having 6 to 16 carbon atoms, aliphatic carboxylic acids having 1 to 18 carbon atoms, alicyclic carboxylic acids having 6 to 12 carbon atoms, aromatic carboxylic acids having 7 to 15 carbon atoms, and adducts and complexes of said alcohols, carboxylic acids or phenols with magnesium chloride or aluminum chloride.

4. The catalyst composition of claim 1 wherein in component (a-1), the magnesium/titanium atomic ratio is from 2 to 100, and the halogen/titanium atomic ratio is from 4 to 100.

5. The catalyst composition of claim 1 wherein the titanium component (a-1) is used for the component (A).

6. The catalyst composition of claim 1 wherein the titanium component (a-1) is used as the component (A).

7. The catalyst composition of claim 6 wherein the ratio x:y is 6–50:1.

8. The catalyst composition of claim 6 wherein the amount of the organic compound containing active hydrogen bonded to oxygen is from 1 to 50 moles per titanium atom in the component (a-1).

9. The catalyst composition of claim 6 wherein the halogen-Al atomic ratio is from 1.25 to 1.75.

10. The catalyst composition of claim 5 wherein the halogen-Al atomic ratio is from 1.25 to 1.75.

* * * * *

UNITED STATES PATENT AND TRADEMARK OFFICE
CERTIFICATE OF CORRECTION

PATENT NO. : 4,525,469
DATED : June 25, 1985
INVENTOR(S) : Takashi Ueda, Et Al.

It is certified that error appears in the above-identified patent and that said Letters Patent is hereby corrected as shown below:

Claim 6, line 2, delete "(a-1)", insert --(a-2)--.

Signed and Sealed this

Fifteenth Day of October 1985

[SEAL]

Attest:

Attesting Officer

DONALD J. QUIGG

Commissioner of Patents and Trademarks—Designate